United States Patent [19]

Fukami et al.

[11] Patent Number: 5,103,330
[45] Date of Patent: Apr. 7, 1992

[54] MATRIX-TYPE LIQUID-CRYSTAL DISPLAY PANEL HAVING REDUNDANT CONDUCTOR STRUCTURES

[75] Inventors: Seiji Fukami, Tenri; Akihiko Imaya; Yoshitaka Hibino, both of Nara, all of Japan

[73] Assignee: Sharp Kabushiki Kaisha, Osaka, Japan

[21] Appl. No.: 251,562

[22] Filed: Sep. 30, 1988

[30] Foreign Application Priority Data

Feb. 16, 1988 [JP] Japan ................ 63-33691

[51] Int. Cl.⁵ .......................... G02F 1/133
[52] U.S. Cl. .......................... 359/59; 359/87; 357/23.7
[58] Field of Search ............ 350/333, 334, 336; 340/784; 357/23.7, 45

[56] References Cited

U.S. PATENT DOCUMENTS

| | | | |
|---|---|---|---|
| 4,176,917 | 12/1979 | Yasutake | 350/336 |
| 4,630,355 | 12/1986 | Johnson | 350/333 |
| 4,688,896 | 8/1987 | Castleberry | 350/336 |
| 4,697,331 | 10/1987 | Boulitrop et al. | 350/336 |
| 4,738,749 | 4/1988 | Maurice et al. | 350/336 |
| 4,778,258 | 10/1988 | Parks et al. | 350/334 |
| 4,804,953 | 2/1989 | Castleberry | 350/333 |
| 4,807,973 | 2/1989 | Kawasaki | 350/334 |
| 4,857,907 | 8/1989 | Koden | 350/336 |
| 4,991,939 | 2/1991 | Momose et al. | 350/336 |

FOREIGN PATENT DOCUMENTS

| | | | |
|---|---|---|---|
| 0166225 | 2/1986 | European Pat. Off. | |
| 0124677 | 9/1979 | Japan | 357/70 |
| 0283319 | 12/1987 | Japan | 350/333 |
| 0061228 | 3/1988 | Japan | 350/334 |
| 0202720 | 8/1988 | Japan | 350/336 |
| 2032127 | 4/1980 | United Kingdom | |

Primary Examiner—Stanley D. Miller
Assistant Examiner—Tai V. Duong
Attorney, Agent, or Firm—Morrison & Foerster

[57] ABSTRACT

A matrix-type liquid-crystal display panel, in which thin-film transistors are used as address display elements, comprises an electroconductive film that is formed on at least one wiring pattern connected to an electrode of the thin-film transistor, the width of the electroconductive film being greater than that of the wiring pattern.

3 Claims, 3 Drawing Sheets

MATRIX-TYPE LIQUID-CRYSTAL DISPLAY PANEL HAVING REDUNDANT CONDUCTOR STRUCTURES

BACKGROUND OF THE INVENTION

1. Field of the Invention

This invention relates to an improvement in a matrix-type liquid-crystal display panel in which thin-film transistors are used as address display elements, and more particularly to an improvement in the pattern of wiring to connect the electrodes of thin-film transistors.

2. Description of the Prior Art

One example of a matrix-type liquid-crystal display panel of the conventional type in which reverse stagger-type thin-film transistors are used as the address display elements is shown in FIGS. 3 and 4. FIGS. 4a and 4b are cross-sectional views taken at lines O-P and Q-R of FIG. 3, respectively.

In such a liquid-crystal display panel, a substrate-protective film 2 is formed on an insulating substrate 1. On top of the substrate-protective film 2, there are provided, in this order, a gate electrode 3, a gate insulating film 4, an amorphous silicon film (a-Si film) 5, a protective insulating film 6, an n+ a-Si film 7, and a source electrode and drain electrode 8, by which a reverse stagger-type thin-film transistor is formed. The picture-element electrodes 9 for display are electrically connected to the source or drain electrodes 8. In FIG. 4a, reference numeral 10 shows a protective film.

In this kind of a matrix-type liquid-crystal display panel, vertical scanning signals are supplied to a plurality of signal wires, each of which is connected to the wiring pattern 3a in the transverse direction of FIG. 3, the said wiring pattern being further connected to the gate electrode 3 of each thin-film transistor. On the other hand, picture signals are supplied to a plurality of signal wires, each of which is connected to the source wiring pattern 8a through the wiring pattern 8b in the longitudinal direction of FIG. 3, the said source wiring pattern being further connected to the source electrode of each thin-film transistor. The liquid crystals are driven by the passage of electricity in order through the picture-element electrode 9 of each thin-film transistor.

In the conventional matrix-type liquid-crystal display panel, the wiring patterns 3a, 8a, and 8b that are connected to the electrodes 3 and 8 of the thin-film transistors are in some cases overetched during the etching step in the manufacturing process. In such cases, the width of the wiring patterns 3a, 8a, and 8b becomes narrower, and in a severe case, these wiring patterns cause disconnection. As a result, the resistance of the wiring becomes high, and the level of the signal goes to decay; disconnections give rise to line defects, so that the display panel cannot be used in practice. For that reason, the production yield of matrix-type liquid-crystal display panels is greatly decreased.

SUMMARY OF THE INVENTION

The matrix-type liquid-crystal display panel of this invention, which overcomes the above-discussed and numerous other disadvantages and deficiencies of the prior art, comprises an electroconductive film that is formed on at least one wiring pattern connected to an electrode of said thin-film transistor, the width of said electroconductive film being greater than that of said wiring pattern.

In a preferred embodiment, the electrode is at least one electrode selected from the group consisting of gate electrode, source electrode, and drain electrode.

In a preferred embodiment, the electroconductive film is made of a transparent electroconductive material.

Thus, the invention described herein makes possible the objectives of (1) providing a matrix-type liquid-crystal display panel in which there is no possibility of line defects being caused by a decrease in the width of a wiring pattern connected to each electrode of the thin-film transistor or by a disconnection in the wiring pattern, so that a high-quality display is reliably obtained; (2) providing a matrix-type liquid-crystal display panel in which the width of an electroconductive film formed on the wiring pattern is greater than the said wiring pattern, so that flaws in the wiring pattern that are produced by overetching can be compensated for by the said electroconductive film; and/or (3) providing a matrix-type liquid-crystal display panel in which the width of the wiring pattern does not decrease, and the electric resistance of disconnected parts of the wiring pattern is not raised, so that the level of an input signal, does not decay, resulting in a display picture without line defects.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
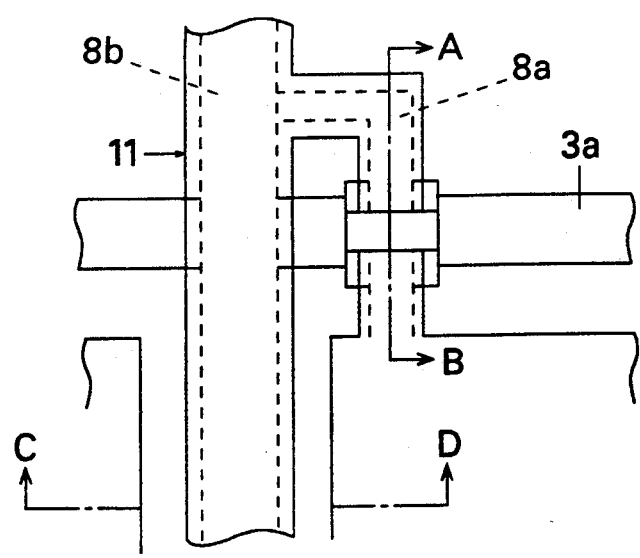
FIG. 1 is a fragmentary plan view showing one example of the matrix-type liquid-crystal display panel of this invention.
Figure 2A:
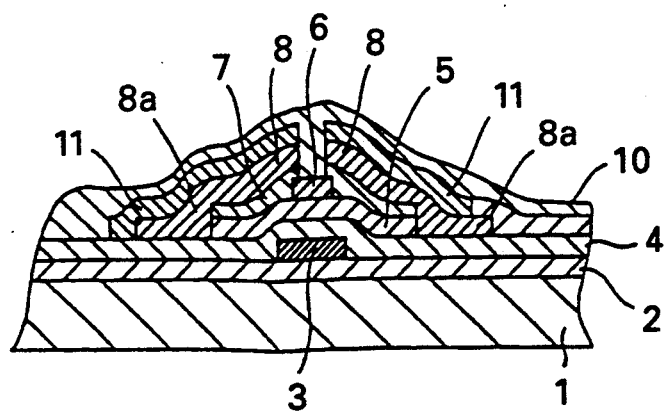
FIG. 2a is a cross-sectional view taken at line A-B of FIG. 1.
Figure 2B:
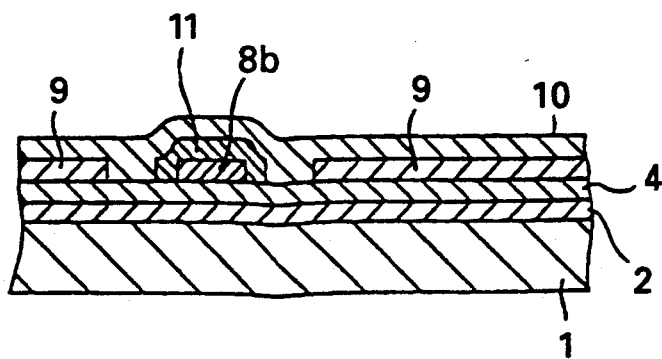
FIG. 2b is a cross-sectional view taken at line C-D of FIG. 1.
Figure 3:
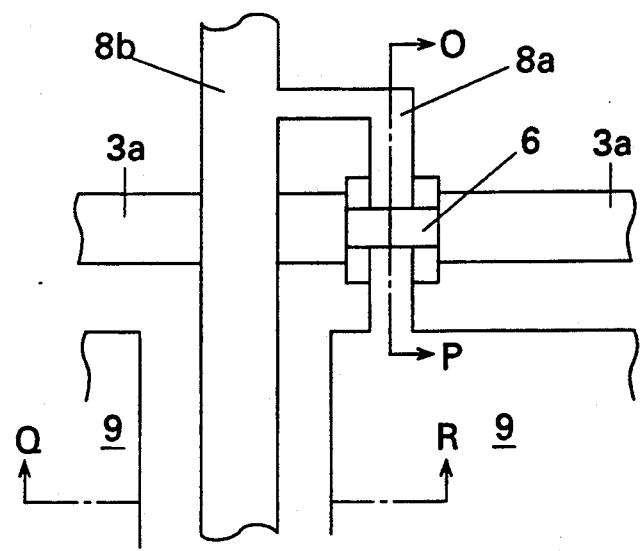
FIG. 3 is a fragmentary plan view showing one example of the conventional matrix-type liquid-crystal display panel.
Figure 4A:
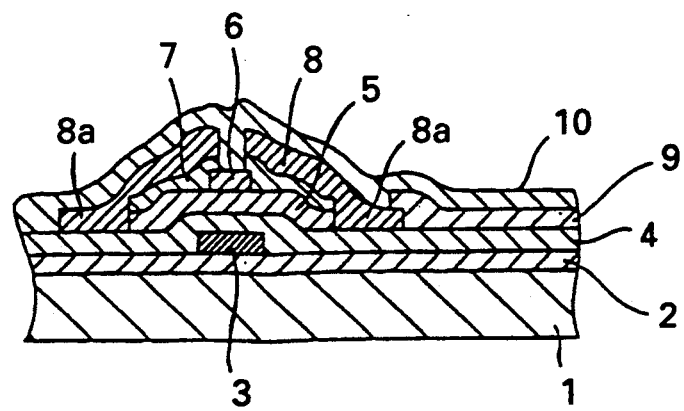
FIG. 4a is a cross-sectional view taken at line O-P of FIG. 3.
Figure 4B:
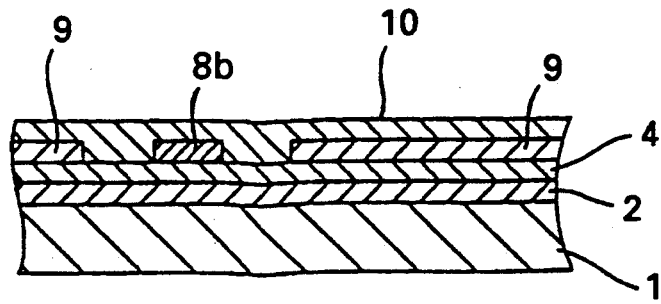
FIG. 4b is a cross-sectional view taken at line Q-R of FIG. 3.

FIG. 1 is a fragmentary plan view showing one example of the matrix-type liquid-crystal display panel of this invention. FIG. 2a is a cross-sectional view taken at line A-B of FIG. 1, and FIG. 2b is a cross-sectional view taken at line C-D of FIG. 1. In FIG. 1, the uppermost layer, which is the protective film 10 to be mentioned below, is omitted.

The structure of this matrix-type liquid-crystal display panel will become clear during the following explanation of its manufacturing process. On top of an insulating substrate 1 that is made of glass, a substrate-protective layer 2 that is made of tantalum pentoxide is formed to the thickness of about 3000 Å. Next, a layer of tantalum about 3000 Å thick is formed by sputtering, and then gate electrode 3 is formed by photoetching.

Thereafter, by the plasma CVD method, the following are layered successively: a gate insulating film 4 that is made of $SiN_x$ about 3000 Å thick; an a-Si film 5 that is about 200 Å thick; and an insulating layer 6 that is made of $SiN_x$ about 2000 Å thick.

After the a-Si film 5 and the insulating layer 6 have had their patterns made by photoetching, the $n^+$ a-Si film 7 that is about 400 Å thick is formed thereon, and in the same way, its pattern is made by photoetching.

Following this, a source-drain metallic film about 3000 Å thick is formed, and its pattern is made by photoetching so that the source electrode and drain electrode 8 are formed at the same time as the wiring patterns 8a and 8b used for the source bus lines.

Next, a transparent electroconductive film about 1000 Å thick is formed that is made from a transparent electroconductive material such as ITO (indium tin oxide), and its pattern is made by photoetching, so as to form picture element electrode 9 and electroconductive film 11 to compensate for disconnections in the source bus lines. Then, as the final layer, a coating about 5000 Å thick is made, forming a protective film 10. As shown in FIGS. 1 and 2, the width of the electroconductive film 11 to compensate for disconnections is greater than the width of the wiring patterns 8a and 8b.

Figure 5:
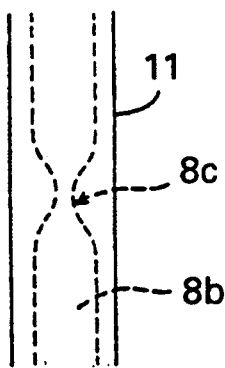
FIG. 5 is a plan view showing the function of an electroconductive film when a region with a narrow width is produced in a wiring pattern.

As is clear from the explanation above of the manufacturing process, in this matrix-type liquid-crystal display panel, an electroconductive film 11 to compensate for disconnections that has a width greater than that of the wiring pattern 8a and 8b is formed on these wiring patterns 8a and 8b. Therefore, as shown in FIG. 5, when patterning is done of the wiring pattern 8b by means of etching, if a region 8c with a narrow width is produced by overetching, an increase in the resistance of the wiring is prevented by the electroconductive film 11 to compensate for disconnections.

Figure 6A:
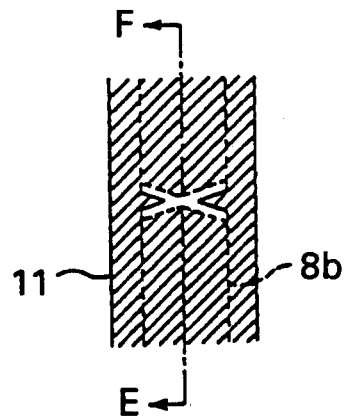
FIGS. 6a ad 6c are plan views showing the function of an electroconductive film when disconnection occurs in a wiring pattern.
Figure 6C:
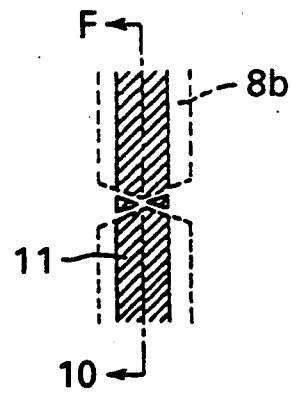
FIG. 6b is a cross-sectional view taken at line E-F of FIG. 6a or 6c.
Figure 6B:
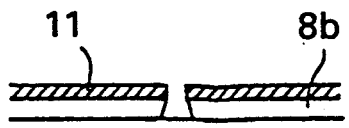

Also, as shown in FIGS. 6a and 6b, with the conventional matrix-type liquid-crystal display panel, when disconnection occurs in wiring pattern 8b, the electroconductive film 11 just above the wiring pattern 8b cannot cover the broken portion of the wiring pattern 8b. Thus, when the width of the electroconductive film 11 to compensate for disconnections is the same or less than the width of the wiring pattern 8b, as shown in FIG. 6c, there is disconnection in the electroconductive film 11, so that it cannot compensate for the disconnection.

According to this invention, as shown in FIG. 6a, the width of the electroconductive film 11 is greater than the width of the wiring pattern 8b, so that even when the electroconductive film 11 just above the wiring pattern 8b cannot cover the broken portion of the wiring pattern 8b, there is no disconnection in the electroconductive film 11, and thus continuity is maintained. Therefore, a liquid-crystal display panel constructed in this way eliminates the possibility of a decrease in the display quality caused by line faults.

With the matrix-type liquid-crystal display panel described above, an electroconductive film 11 was formed to compensate for disconnections in the wiring pattern that constitutes the source bus lines, but it is also possible to form the same kind of electroconductive film to compensate for disconnections in the gate bus bar. That is, if an electroconductive film to compensate for disconnections is formed with respect to a desired wiring pattern that is connected to the gate electrode, the source electrode, or the drain electrode of a thin-film transistor, it is possible to attain the excellent advantages of this invention.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A matrix-type liquid-crystal display panel in which thin-film transistors connected to picture element electrodes are used as address display elements, comprising an electroconductive film that is formed directly on an electrode of the thin film transistor and on at least one wiring pattern connected to said electrode of said thin-film transistor, and is formed with the same material as that for the picture element electrode, the width of said electroconductive film being greater than that of said wiring pattern and that of said electrode.

2. A matrix-type liquid-crystal display panel according to claim 1, wherein said electrode is at least one electrode selected from the group consisting of a source electrode and a drain electrode.

3. A matrix-type liquid-crystal display panel according to claim 1, wherein said electroconductive film is made of a transparent electroconductive material.

* * * * *